Oct. 13, 1953
F. V. SCHLEIMER
2,654,941
FLEXIBLE-CONDUIT CUTTING TOOL
Filed Jan. 15, 1951
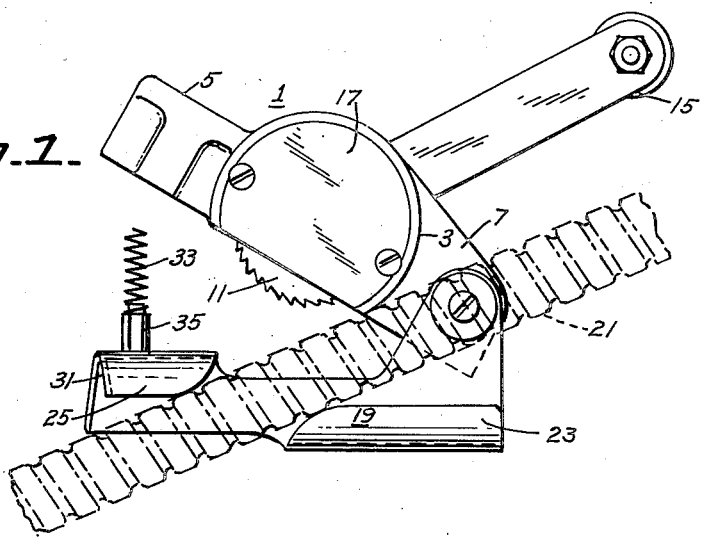
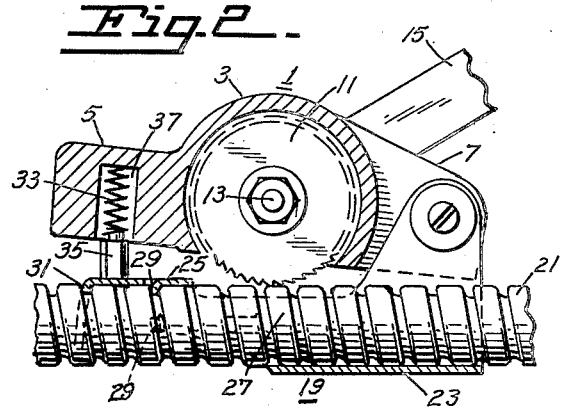
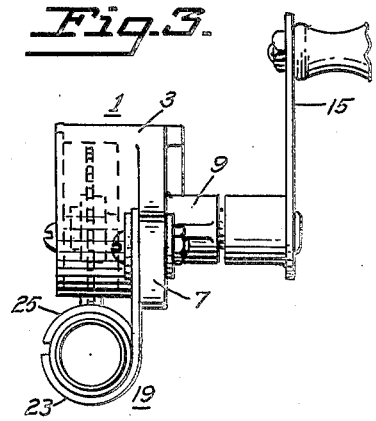
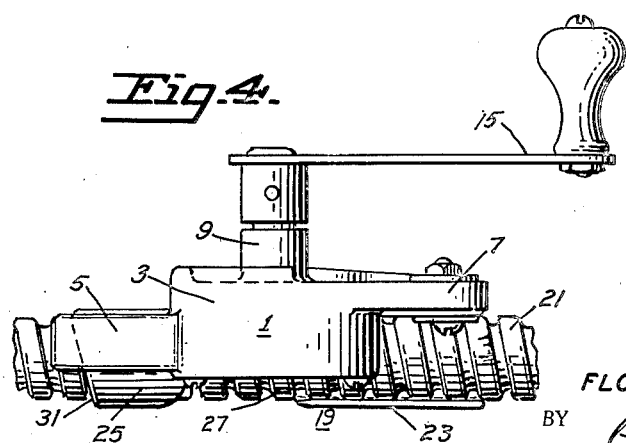
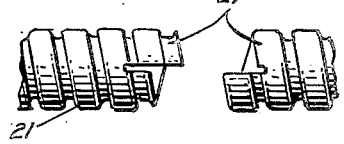
INVENTOR.
FLOYD V. SCHLEIMER
BY Charles O. Bruce
ATTORNEY.

Patented Oct. 13, 1953

2,654,941

UNITED STATES PATENT OFFICE 2,654,941

FLEXIBLE-CONDUIT CUTTING TOOL

Floyd V. Schleimer, San Francisco, Calif.

Application January 15, 1951, Serial No. 206,113

5 Claims. (Cl. 29—69)

My invention relates to cutting tools, and more particularly to a tool adapted for the cutting of flexible conduit.

Conventional practice in the cutting of flexible conduit entails the use of a hack saw which at best is inconvenient and conducive to mutilation of the conduit and such conductors as may be housed therein.

Attempts to depart from the aforementioned hack saw method have led to the development of various types of tools based on the principle of pliers, wherein a cutting jaw or jaws are relied on to slit the conduit transverse to the spiral turns of which the conduit is formed.

Granted that such tools could be designed to slit such type of conduit, it requires no stretch of the imagination to appreciate the distortions and burrs which the use of such tools would cause, thus rendering the use of such conduit hazardous thereafter, in electrical installations.

Among the objects of my invention are:

(1) To provide a novel and improved tool for cutting flexible conduit;

(2) To provide a novel and improved tool for cutting flexible conduit without introducing permanent distortion in the conduit or leaving burrs along the edges of the cut;

(3) To provide a novel and improved tool of simple but rugged design for cutting flexible conduit;

(4) To provide a novel and improved conduit cutting tool which will not bind or stall during a cutting operation;

(5) To provide a novel and improved conduit cutting tool which may be employed in cutting conduit which has already been installed and close to a wall surface.

(6) To provide a novel and improved conduit cutting tool utilizing a circular saw, and permitting a sensitive application of pressure thereto.

Additional objects of my invention will be brought out in the following description of a preferred embodiment of the same, taken in conjunction with the accompanying drawings wherein—

Figure 1 is a side elevational view of my invention in its preferred form and in open position;

Figure 2 is a view in section taken in the plane of the rotary saw of Figure 1 and with the device in condition for operation;

Figure 3 is an end view of the device in the condition of Figure 2;

Figure 4 is a plan view of the device in the condition of Figure 2;

Figure 5 is a view of a section of flexible conduit after severance by the device of my invention.

Referring to the drawings, my improved conduit cutting tool involves a rotary saw holder 1 which comprises an open-bottom casing 3 and lateral offset end extensions 5 and 7 integral therewith, the casing preferably being also open at one side and provided on its other side with a central bearing 9.

Within the casing is a rotary saw 11 of a diameter sufficient to expose a portion of its cutting periphery through the bottom of the casing. This saw is mounted on a shaft 13 which is journalled in the bearing 9 and which extends therebeyond for the application thereto of means such as a handle 15 or suitable motor for rotation of the saw.

A cover plate 17 may be applied across the open side of the casing, following the installation of the saw therein.

Hingedly secured to the end extension 7 so as to lie beneath the casing in the plane of the rotary saw, is a cradle 19 for the reception and support of a conduit 21. Such cradle is preferably formed of sheet metal and is so shaped as to provide a conduit supporting section 23 at its hinged end and a conduit covering section 25 at the opposite end, with sufficient spacing between the two sections to permit of the exposure of that portion 27 of the conduit which includes the desired location of severance, in addition to providing for loading of a conduit in the manner indicated in Figure 1.

The cradle being hinged to the end extension of the saw holder, any conduit resting therein may be urged into contact with the saw as the saw is rotated, to thereby sever two or more of the convolutions of which the flexible conduit is formed.

With such type of flexible conduit, the slitting of a pair of adjacent convolutions is sufficient to permit the conduit to be unthreaded into two parts at that point.

Flexible conduit of the character with which we are concerned, possesses a substantial amount of longitudinal resiliency. Because of this, there is a tendency for the cable to stretch and contract during cutting, if the revolutions of the saw are not maintained uniform, which under manual operation is exceedingly difficult to realize.

Accordingly, to stabilize the conduit at the region of cutting, I punch out from the material of the cradle, one or more inwardly turned tabs 29, positioned to engage the conduit between convolutions and as close as practical, to the convolutions being acted upon by the rotary saw. In this manner the drag of the saw upon the conduit cannot act beyond one or two convolutions of the conduit at most. As an aid in this connection, the free edge 31 of the cradle may be formed on a spiral and turned inwardly to similarly engage a conduit. While such tabs are shown in the conduit covering section 25 only, similar tabs might be incorporated to advantage in the conduit supporting section 23.

Normally, the cradle is biased to its loading position, that is in spaced relationship to the saw, by resilient compression means introduced between the cradle and the saw holder. In the specific embodiment of my invention illustrated, such resilient means constitutes a spiral spring 33 mounted over the end of a stud 35 affixed to the free end of the cradle, the spring in turn being of sufficient length to enter and engage the bottom of an opening 37 in the extension 5.

The manner of utilizing the cutting tool of my invention becomes more or less apparent from the above description. The conduit is placed in the cradle with the desired point of severance disposed below the rotary saw, and as the conduit is urged into engagement with the saw, the saw is rotated and gradually cuts through a pair of the convolutions of the conduit, leaving a clean cut with no burrs along the edges thereof. Following the cutting operation, the conduit is removed from the cradle and unthreaded into two parts as previously mentioned.

It is noted also that the tool may be employed in cutting conduit in its installed position, even though such conduit be affixed to a wall surface. The operation merely involves the preliminary step of slipping the cradle onto the conduit instead of laying the conduit into the cardle when cutting free conduit.

In effecting a cutting operation, pressures employed are important. Excessive pressure of the saw against the conduit in initiating such operation is apt to cause the saw teeth to dig too deeply and jam. Once a cut has been started, however, increased pressure may be applied. Inasmuch as the pressure is applied manually, the degree of applied pressure is therefore under the sensitive control of the operator.

Of important significance in the construction of the tool is the fact that the conduit is supported with its longitudinal axis in the plane of the saw. Thus the saw cuts strictly in line with the longitudinal axis of the conduit, as distinguished from a cut on an angle with such axis. From this it will become apparent that any bending of the conduit in response to pressure of the saw cannot result in binding of the saw as would occur with an angular cut. In fact, such bending of the conduit, if anything, would have a tendency to spread the cut and thus permit the saw to work relatively freely in cutting through the conduit material.

It is, therefore, apparent that my invention as described, fulfills all the objects as recited therefor, and while I have disclosed the same in its preferred form, the device is subject to alteration and modification, without departing from the underlying principles thereof, and I, accordingly, do not desire to be limited in my protection to the specific details illustrated and described, except as may be necessitated by the appended claims.

I claim:

1. A flexible-conduit cutter comprising, a rotary-saw holder, a rotary saw supported thereby and having a portion of its cutting periphery exposed, means for rotating said rotary saw, and means for supporting a conduit against the exposed cutting periphery of said saw and with the longitudinal axis of said conduit in the plane of said saw, said means including a cradle having a conduit supporting section at one end and a conduit covering section at its other end in longitudinal spaced relationship to said supporting section to permit of the loading of a conduit therein, and means hingedly securing said cradle at its conduit supporting end to said rotary saw holder with the plane of said rotary saw coinciding with the median longitudinal plane of the cradle.

2. A flexible-conduit cutter comprising, a rotary-saw holder including a casing, a rotary saw supported in said casing and having a portion of its cutting periphery exposed, means for rotating said rotary saw, a cradle for receiving and supporting a conduit to be cut, in adjustable proximity to the exposed cutting periphery of said saw, said cradle including a conduit supporting section at one end and a conduit covering section at its other end in longitudinal spaced relationship to said supporting section to permit of the loading of a conduit therein, and means for engaging such conduit between convolutions on the saw engageable side of such conduit for stabilizing such conduit against longitudinal flexing along said saw engageable side when urged into contact with the exposed peripheral portion of said rotary saw while in motion, said means including a tab depending from said conduit covering section of said cradle.

3. A flexible-conduit cutter comprising, a rotary-saw holder including a casing, a rotary saw journalled in said casing and having a portion of its cutting periphery exposed, means for rotating said rotary saw, a cradle for receiving and supporting a conduit to be cut, with a portion of such conduit exposed which includes the desired location of severance, means hingedly securing said cradle to said rotary-saw holder with said cradle in proximity to the exposed portion of the cutting periphery of said saw, and resilient compression means interposed between said rotary-saw holder and said cradle to normally maintain separation of said cradle and said saw in the absence of an opposing pressure exceeding that offered by said resilient compression means.

4. A flexible-conduit cutter comprising, a rotary-saw holder including a casing, a rotary saw journalled in said casing and having a portion of its cutting periphery exposed, means for rotating said rotary saw, a cradle for receiving and supporting a conduit to be cut, said cradle having a conduit supporting section at one end and a conduit covering section at the other end with sufficient spacing between the two sections to permit of the loading of a conduit therein, means hingedly securing said cradle at its conduit supporting end to said rotary-saw holder and with said cradle in proximity to the exposed portion of the cutting periphery of said saw, resilient compression means interposed between said rotary-saw holder and said cradle to normally maintain separation of said cradle and said saw in the absence of an opposing pressure exceeding that offered by said resilient compression means, and means for stabilizing such conduit in said cradle during sawing thereof.

5. A flexible-conduit cutter comprising, a rotary-saw holder including a casing, a rotary saw journalled in said casing and having a portion of its cutting periphery exposed, means for rotating said rotary saw, a cradle for receiving and supporting a conduit to be cut, said cradle having a conduit supporting section at one end and a conduit covering section at the other end with sufficient spacing between the two sections to permit of the loading of a conduit therein with the desired location of severance exposed, means hingedly securing said cradle at its conduit supporting end to said rotary-saw holder and with said cradle spacing in proximity to the exposed portion of the cutting periphery of said saw, resilient compression means interposed between said rotary-saw holder and said cradle to normally maintain separation of said cradle and said saw in the absence of an opposing pressure exceeding that offered by said resilient compression means, and means for stabilizing such conduit when introduced into said cradle, to hold such conduit against substantial lateral movement when urged into contact with the exposed peripheral portion of said rotary saw while in motion.

FLOYD V. SCHLEIMER.

References Cited in the file of this patent

UNITED STATES PATENTS

| Number | Name | Date |
|---|---|---|
| 2,031,470 | Eck et al. | Feb. 18, 1936 |
| 2,374,753 | Kramer | May 1, 1945 |
| 2,396,442 | Shaner et al. | Mar. 12, 1946 |
| 2,502,656 | Koett | Apr. 4, 1950 |